United States Patent [19]

Markow

[11] Patent Number: 6,087,961
[45] Date of Patent: Jul. 11, 2000

[54] DIRECTIONAL WARNING SYSTEM FOR DETECTING EMERGENCY VEHICLES

[75] Inventor: Paul A. Markow, Huntsville, Ala.

[73] Assignee: DaimlerChrysler Corporation, Auburn Hills, Mich.

[21] Appl. No.: 09/425,607

[22] Filed: Oct. 22, 1999

[51] Int. Cl.[7] ................................................ G08G 1/00
[52] U.S. Cl. ........................................ 340/902; 340/903
[58] Field of Search ................................... 340/902, 903, 340/901, 906, 539

[56] References Cited

U.S. PATENT DOCUMENTS

| | | | |
|---|---|---|---|
| 3,710,313 | 1/1973 | Kimball et al. | 340/902 |
| 3,876,940 | 4/1975 | Wickord et al. | 455/341 |
| 3,997,868 | 12/1976 | Ribnick et al. | 340/902 |
| 4,238,778 | 12/1980 | Ohsumi | 340/903 |
| 4,403,208 | 9/1983 | Hodgson et al. | 340/902 |
| 4,443,790 | 4/1984 | Bishop | 340/539 |
| 4,764,978 | 8/1988 | Argo et al. | 455/1 |
| 5,278,553 | 1/1994 | Cornett et al. | 340/902 |
| 5,303,259 | 4/1994 | Loveall | 375/135 |
| 5,572,201 | 11/1996 | Graham et al. | 340/902 |
| 5,635,921 | 6/1997 | Maxwell et al. | 340/902 |
| 5,757,284 | 5/1998 | Trizzino et al. | 340/902 |
| 5,825,304 | 10/1998 | Marin | 340/903 |
| 5,889,475 | 3/1999 | Klosinski et al. | 340/902 |
| 5,917,430 | 6/1999 | Greneker, III et al. | 340/905 |
| 5,926,112 | 7/1999 | Hartzell | 340/902 |

*Primary Examiner*—Jeffery A. Hofsass
*Assistant Examiner*—Sihong Huang
*Attorney, Agent, or Firm*—James R. Yee

[57] ABSTRACT

A system for warning motorists of the presence of an emergency vehicle is provided. The system includes a transmitter adapted to be coupled to the emergency vehicle for emitting an emergency signal. The system also includes a direction finding antenna adapted to be coupled to the vehicle of a motorist's vehicle, a receiver coupled to the direction finding antenna and adapted for receiving the emergency signal and producing a directional signal in response thereto, and an audio system for generating an audio playback signal which identifies the presence of the emergency vehicle as well as the relative direction between it and the motorist's vehicle.

19 Claims, 2 Drawing Sheets

DIRECTIONAL WARNING SYSTEM FOR DETECTING EMERGENCY VEHICLES

BACKGROUND OF THE INVENTION

1. Technical Field

The present invention relates generally to vehicle information systems and more particularly to a system which alerts the occupants of a vehicle to the presence of emergency vehicles, such as police cars, ambulances, fire fighting trucks or trains.

2. Discussion

Emergency vehicles are typically equipped with a plurality of flashing lights and loud sirens to alert motorists to their presence and yield the right of way to the emergency vehicle. While flashing lights and loud sirens are very effective in certain situations, such as at night on relatively straight roads away from intersections, there are times when these devices fail to effectively communicate the presence of the emergency vehicle to approaching motorists. This failure may result from the errors of an approaching motorist or from the characteristics of the area which the emergency vehicle is traveling.

For example, heavy overgrowth of trees and shrubs on the sides of an intersection will render the emergency vehicle difficult to see by approaching motorists, regardless of the time of day or the extent to which the approaching motorists are focusing on the task of driving. This problem is exacerbated by a motorist's operation of a vehicle audio system at high listening levels, as this tends to obscure the sound produced by the emergency vehicle's sirens.

Several systems for alerting motorists of approaching emergency vehicles have been developed but have not received widespread acceptance. These systems, such as the one disclosed in U.S. Pat. No. 4,238,778 which is hereby incorporated by reference as if fully set forth herein, alerts motorists to the presence of emergency vehicles if they are within a predetermined distance from one another, say for example, 100 yards. The emergency vehicle utilizes a VHF or UHF carrier signal which is transmitted to an omni-direction finding antenna coupled to the motorist's vehicle. This system does not inform the motorist of the relative direction of the emergency vehicle and requires a VHF or UHF receiver to receive the carrier signal.

SUMMARY OF THE INVENTION

It is one object of the present invention to provide a system for warning motorists of the presence of an emergency vehicle which informs the motorist of the relative direction of the emergency vehicle.

It is another object of the present invention to provide a system for warning motorists of the presence of an emergency vehicle which utilizes the vehicle audio system to inform the motorist of the presence and relative direction of the emergency vehicle.

It is yet another object of the present invention to provide a system for warning motorists of the presence of an emergency vehicle through a frequency modulated (FM) signal.

A system for warning motorists of the presence of an emergency vehicle is provided. The system includes a transmitter adapted to be coupled to the emergency vehicle for emitting an emergency signal. The system also includes a direction finding antenna adapted to be coupled to a motorist's vehicle, a receiver coupled to the direction finding antenna and adapted for receiving the emergency signal and producing a directional signal in response thereto, and an audio system for generating an audio playback signal which identifies the presence of the emergency vehicle as well as the relative direction between it and the motorist's vehicle.

Additional advantages and features of the present invention will become apparent from the subsequent description and the appended claims, taken in conjunction with the accompanying drawings.

BRIEF DESCRIPTION OF THE DRAWINGS

FIG. 2b is another view similar to that of FIG. 2a;

DETAILED DESCRIPTION OF THE PREFERRED EMBODIMENT

Figure 1:
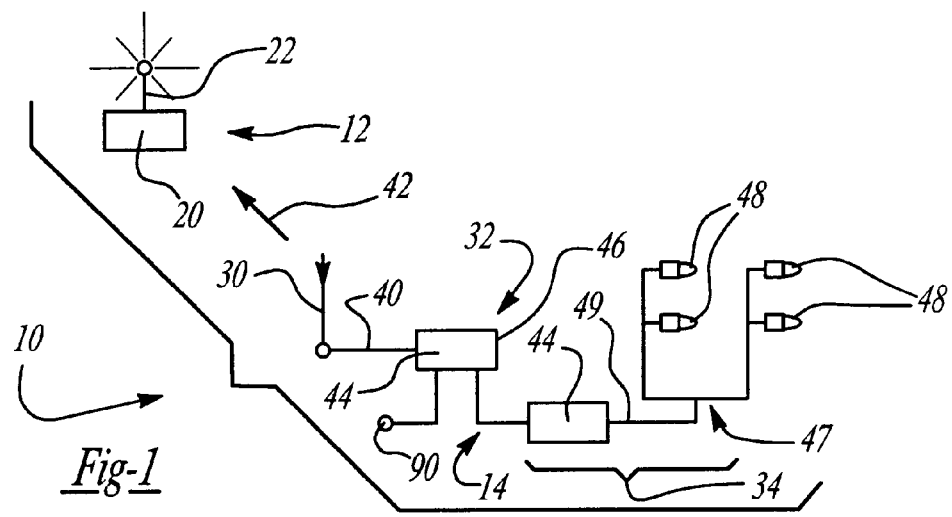
FIG. 1 is a schematic view of a warning system constructed in accordance with the teachings of the present invention.

With reference to FIG. 1 of the drawings, the warning system constructed in accordance with the teachings of the present invention is generally indicated by reference numeral 10. Warning system 10 is shown to include a first portion 12 and a second portion 14. First portion 12 includes a transmitter 20, preferably a low power transmitter which is operable for selectively generating an emergency signal which is transmitted through antenna 22 in a conventional manner. The emergency signal is preferably a frequency modulated (FM) signal.

Second portion 14 includes a direction finding antenna 30, a receiver 32 and an audio system 34. Direction finding antenna 30 is operable for receiving the emergency signal and transmitting it to receiver 32 over a first wire harness 40. Preferably, direction finding antenna 30 is also operable for receiving conventional radio signals broadcast from AM and FM radio stations. Receiver 32 is operable for producing a directional signal indicative of the position of transmitter 20 relative to direction finding antenna 30. The directional signal varies according to the direction of a vector 42 from direction finding antenna 30 to transmitter 20. Preferably, the directional signal also varies according to the relative distance between direction finding antenna 30 and transmitter 20.

The directional signal is transmitted over a second wire harness 46 to audio system 34. Alternatively, first and second wire harnesses 40 and 46 may be combined into a single wire harness. Audio system 34 includes a radio receiver 44 and an audio output device 47 which preferably includes a plurality of audio speakers 48. Radio receiver 44 is operable for generating a first audio playback signal in response to the receipt of the directional signal. Radio receiver 44 is also conventionally operable for producing a second audio playback signal in response to an input audio signal generated from a conventional FM signal broadcast from a radio station or a signal produced from the playing of a conventional cassette tape or compact disc.

The first and second audio playback signals are transmitted to audio output device 47 through a third wire harness 49. The plurality of audio speakers 48 are arranged in a predetermined manner which typically permits audio system 34 to reproduce sound corresponding to the second audio playback signal in stereo. This aspect of audio system 34 is conventional in nature and need not be discussed in further detail. Additionally, audio speakers 48 are operable for producing sound corresponding to the first audio playback signal. This sound may include a series of tones and/or a verbal warning. If the sound corresponding to the first audio playback signal includes a verbal warning, the warning may be used to communicate the fact that an emergency vehicle is approaching, the direction from which the emergency vehicle is approaching (e.g., northwest, south), the relative direction from which the emergency vehicle is approaching (e.g., front left, rear) and/or the distance between the emergency vehicle and direction finding antenna 30.

Figure 2A:
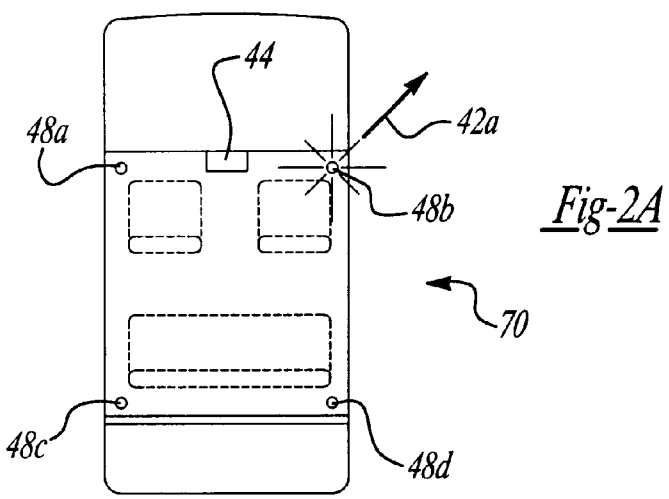
FIG. 2a is a partial top view of a portion of a vehicle equipped with a portion of the warning system of FIG. 1.
Figure 2B:
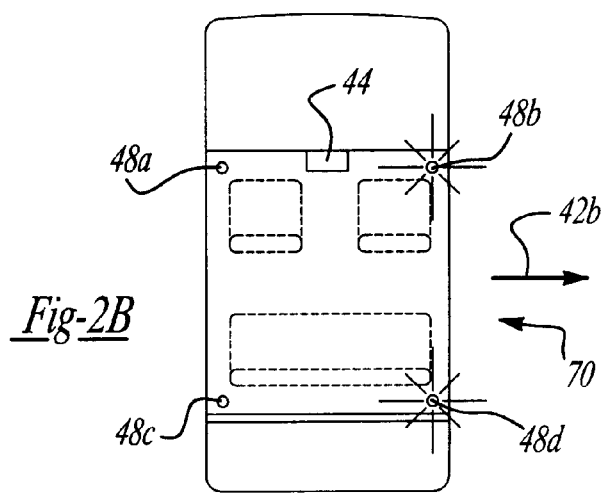

In FIGS. 2a and 2b, a vehicle 70 is illustrated as being equipped with second portion 14. If warning system 10 utilizes tones to alert the vehicle occupants to the presence of an emergency vehicle, the tones produced by audio speakers 48 are preferably directed to individual audio speakers 48a, 48b, 48c and 48d in a manner which corresponds to the direction of vector 42. In FIG. 2a, the direction of vector 42a is equally to the right and forward of vehicle 70. In this example, the first audio playback signal causes only audio speaker 48b to emit a tone to alert the vehicle occupants to the presence of an emergency vehicle in this direction. Similarly, as illustrated in FIG. 2b, the direction of vector 42b is to the right of vehicle 70 and as such, the first audio playback signal causes speakers 48b and 48d to emit a tone to alert the vehicle occupants to the presence of an emergency vehicle in this direction. The pitch of the tone or the frequency with which it is repeated may also be varied according to the distance between the emergency vehicle and direction finding antenna 30.

Figure 3:
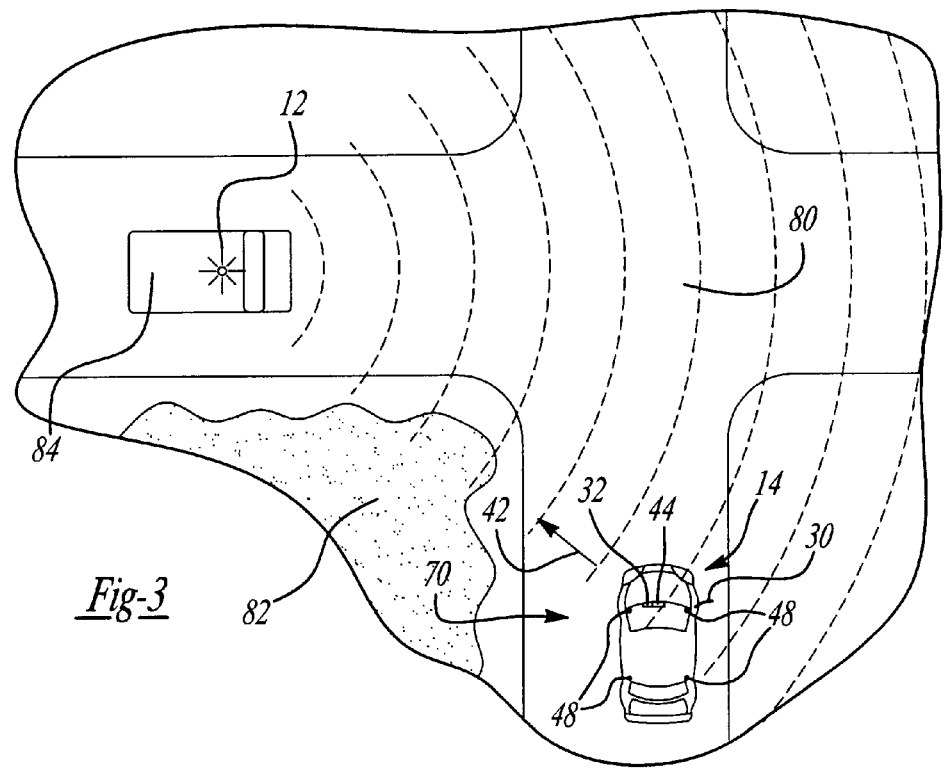
FIG. 3 is a plan view of an intersection illustrating the warning system of the present invention.

Referring now to FIG. 3, warning system 10 is illustrated in operation. Vehicle 70, equipped with second portion 14, is traveling toward intersection 80 at a high rate of speed. Radio receiver 44 is generating the second audio playback signal and audio speakers 48 are emitting high intensity sound (e.g., music) which substantially interferes with the ability of the vehicle occupants to hear approaching emergency vehicles. Overgrown trees and shrubs 82 complicate matters by obscuring the presence of emergency vehicles approaching intersection 80, such as ambulance 84. Ambulance 84 is equipped with first portion 12 and is responding to an emergency situation. Accordingly, transmitter 20 is transmitting an emergency signal which is represented by the curving dashed lines.

When the distance between ambulance 84 and vehicle 70 diminishes to a predetermined level and direction finding antenna 30 receives the emergency signal and transmits it to receiver 32. Receiver 32 produces a direction signal which is transmitted to radio receiver 44. Radio receiver 44 interrupts the generation of the second audio playback signal and generates the first audio playback signal. Preferably, radio receiver 44 may modify the second audio playback signal so as to reproduce the sound associated with the input audio signal (e.g., music) at a lower volume than the sound associated with the first audio playback signal so as to more effectively alert the vehicle occupants to the presence and position of ambulance 84. Alternatively, radio receiver 44 may be configured to completely inhibit the second audio playback signal when it generates the first audio playback signal.

With additional reference to FIG. 1, warning system 10 may also include a canceling switch 90 which is coupled to receiver 32 or radio receiver 44 and operable for generating a canceling signal in response to its manual actuation by one of the vehicle occupants. Operation of canceling switch 90 to produce the canceling signal inhibits the generation of the first audio playback signal and permits the production of the second audio playback signal when the receiver is receiving the emergency signal.

While the present invention has been generally described thus far in terms of particular preferred embodiments, those skilled in the art will appreciate that the invention, in its broader aspects, may be constructed somewhat differently. For example, the receiver and the radio receiver may be combined into a single unit to conserve space within the vehicle and reduce the overall cost of the warning system. As another example, the transmitter 20 may also or alternatively broadcast its position using data from global positioning satellites. In response to the receipt of the emergency signal, the receiver 32 would evaluate the position and speed of both the vehicle 70 and the emergency vehicle to accurately determine the position of an approaching emergency vehicle, as well as its speed and heading relative to vehicle 70.

Figure 4:
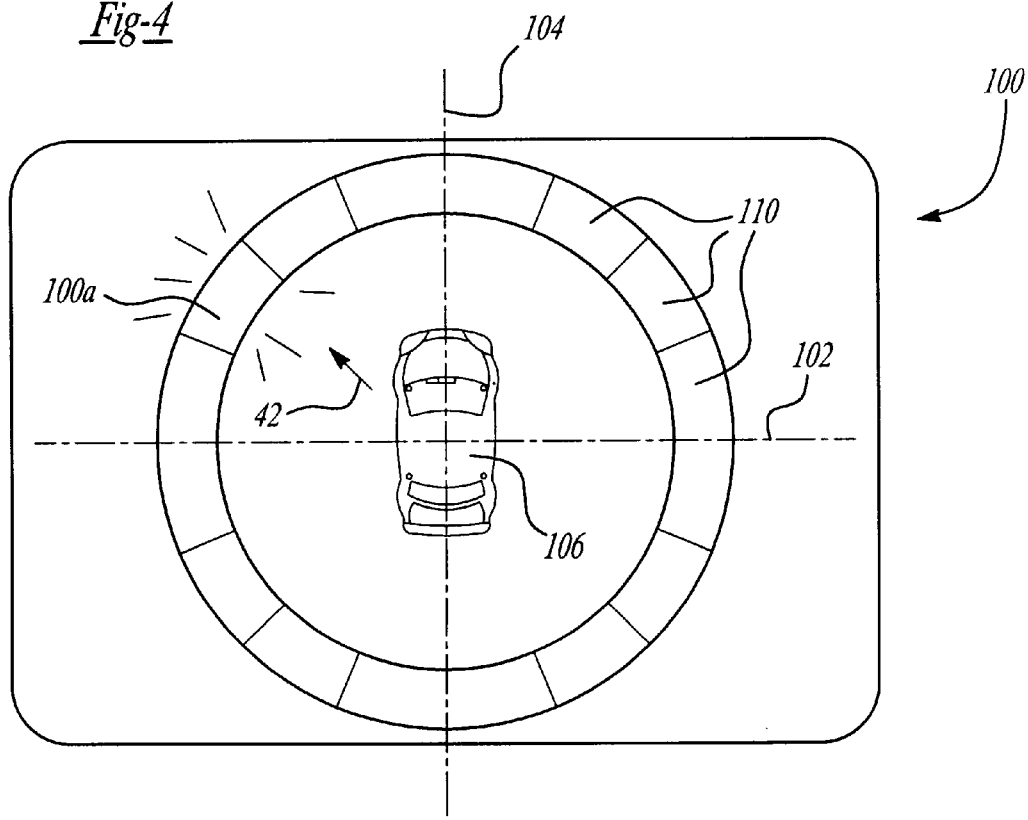
FIG. 4 is a schematic illustration of a graphical display for use in the warning system of the present invention according to a second preferred embodiment.

As yet another example, a graphical interface as illustrated in FIG. 4 may be incorporated into the warning system to provide the vehicle operator with a visual reference as to the presence and location of the approaching emergency. In this example, a display screen 100 having first and second axes 102 and 104, respectively and a vehicle shaped icon 106 is provided. The display screen 100 is divided into a plurality of angular grids 110. Upon the detection of an approaching emergency vehicle, receiver 32 produces a direction signal which is received by the display screen 100. In response to the direction signal, the display screen 100 illuminates the angular grid 100a which corresponds to the heading from vehicle 70 to the emergency vehicle. Icon 106 is provided as a reference for the vehicle operator to aid in the visualization of the location of emergency vehicle relative to vehicle 70.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A system for indicating the direction of an emergency vehicle, comprising:
    a transmitter adapted to be coupled to the emergency vehicle for emitting an emergency signal;
    a direction finding antenna;
    a receiver coupled to the direction finding antenna, the direction finding antenna adapted to receive the emergency signal and produce a directional signal indicative of a direction vector between the direction finding antenna and the emergency vehicle; and
    an audio system coupled to the receiver and adapted to receive the directional signal and generating a first audio playback signal indicative of the direction of the emergency vehicle.

2. The system for indicating the direction of an emergency vehicle of claim 1, wherein the first audio playback signal includes a tone.

3. The system for indicating the direction of an emergency vehicle of claim 2, wherein the tone generated by the audio system is varied based on the distance between the emergency vehicle and the direction finding antenna.

4. The system for indicating the direction of an emergency vehicle of claim 1, wherein the transmitter is a low power transmitter and the emergency signal is a frequency modulated (FM) signal.

5. The system for indicating the direction of an emergency vehicle of claim 1, wherein the audio system is adapted for receiving an audio signal and producing a second audio playback signal in response thereto, the audio system operable for interrupting the second audio playback signal in a predetermined manner and producing the first audio playback signal upon receipt of the directional signal.

6. The system for indicating the direction of an emergency vehicle of claim 5, wherein the audio system completely discontinues the production of the second audio playback signal upon receipt of the directional signal.

7. The system for indicating the direction of an emergency vehicle of claim 6, further comprising a switch assembly coupled to one of said receiver and said audio system, said switch assembly operable for producing a canceling signal adapted for inhibiting the generation of the first audio playback signal and permitting the production of the second audio playback signal when the receiver is receiving the emergency signal.

8. The system for indicating the direction of an emergency vehicle of claim 1, wherein the first audio signal includes a verbal message.

9. The system for indicating the direction of an emergency vehicle of claim 8, wherein the verbal message includes an estimate of the relative distance between the emergency vehicle and the direction finding antenna.

10. The system for indicating the direction of an emergency vehicle of claim 8, wherein the verbal message includes a warning that the emergency vehicle is approaching.

11. The system for indicating the direction of an emergency vehicle of claim 1, further comprising a display device coupled to the receiver and providing a graphical representation of the direction vector.

12. A system for indicating the direction of an emergency vehicle, comprising:

a low power transmitter adapted to be coupled to the emergency vehicle for emitting a frequency modulated (FM) emergency signal;

a direction finding antenna;

a receiver coupled to the direction finding antenna, the direction finding antenna adapted to receive the emergency signal and produce a directional signal indicative of a direction vector between the direction finding antenna and the emergency vehicle; and an audio system coupled to the receiver and adapted to receive the directional signal and generate a first audio playback signal indicative of the direction of the emergency vehicle in response to the receipt of the directional signal, the audio system further adapted for receiving an audio signal and producing a second audio playback signal in response thereto, the first audio playback signal including a tone portion, the tone portion varying based on the distance between the emergency vehicle and the direction finding antenna, the audio system operable for interrupting the second audio playback signal in a predetermined manner and producing the first audio playback signal upon receipt of the directional signal.

13. The system for indicating the direction of an emergency vehicle of claim 12, wherein the audio system completely discontinues the production of the second audio playback signal upon receipt of the directional signal.

14. The system for indicating the direction of an emergency vehicle of claim 13, further comprising a switch assembly coupled to one of said receiver and said audio system, said switch assembly operable for producing a canceling signal adapted for inhibiting the generation of the first audio playback signal and permitting the production of the second audio playback signal when the receiver is receiving the emergency signal.

15. The system for indicating the direction of an emergency vehicle of claim 12, wherein the first audio signal includes a verbal message portion.

16. The system for indicating the direction of an emergency vehicle of claim 12, wherein the audio system includes at least four audio speakers adapted to be positioned in a vehicle such that one of the at least four audio speakers is positioned proximate each of a left front, a right front, a left rear and a right rear corner of the vehicle, the tone emitting from not more than two of the at least four audio speakers in a manner which corresponding to the direction of the emergency vehicle.

17. The system for indicating the direction of an emergency vehicle of claim 16, wherein the verbal message includes an estimate of the relative distance between the emergency vehicle and the direction finding antenna.

18. The system for indicating the direction of an emergency vehicle of claim 16, wherein the verbal message includes a warning that the emergency vehicle is approaching.

19. The system for indicating the direction of an emergency vehicle of claim 12, further comprising a display device coupled to the receiver and providing a graphical representation of the direction vector.

* * * * *